United States Patent Office 3,101,264
Patented Aug. 20, 1963

3,101,264
METHOD OF DELAYING BUD-BREAK IN FRUIT TREES
William I. Boyd, North Brookfield, Mass., Henry J. Eavis, Winchester, Va., and Panos L. Poulos, Wilmington, Del., assignors to E. I. du Pont de Nemours and Company, Wilmington, Del., a corporation of Delaware
No Drawing. Filed Nov. 1, 1960, Ser. No. 66,401
2 Claims. (Cl. 71—2.7)

This invention relates to a novel process for delaying the dormancy break of fruit-tree buds. More particularly, the process comprises the application to fruit-tree buds of a composition containing tetramethylthiuram disulfide.

By using this process, one can keep fruit-tree buds from blossoming or "breaking" for as long as one week to ten days. This is useful in fruit-growing areas which have unseasonably warm spells before the frost-free date. Fruit growers in such areas often have large crop losses because the buds break during a warm spell and are then damaged during a subsequent frost. This process prevents these losses because breaking of the buds can be delayed until after the danger of the last frost has passed.

The process is especially effective on apple trees, but such trees as pear and citrus are also protected.

It is preferred, for ease of application, that the tetramethylthiuram-containing compositions to be applied to the trees be in liquid suspension form. Such liquid suspensions can be prepared by using conventional pesticide adjuvants as emulsifiers and dispersants. The choice of adjuvants is easily made by the artisan and is determined by such factors as temperature, rainfall, etc., of the area in which the composition is to be used. Suitable adjuvants are described in Flenner U.S. Patent 2,948,655 and Klopping U.S. Patent 2,784,227. The portions of these patents which describe the adjuvants are hereby incorporated by reference.

These liquid formulations are prepared to contain from .01 to .025 pound of active ingredient per gallon, that is, from about 0.1% to about 0.5%, by weight. These formulations can be applied directly to the fruit trees.

Highly preferred for use in the process of this invention because of its availability and ease of application is the composition disclosed and claimed in copending application Serial No. 755,428, filed August 18, 1958, now abandoned. This composition is a liquid suspension containing 42% tetramethylthiuram disulfide. Before it is applied to fruit trees, it must be diluted with water to a final application concentration of 2-5 gallons of the suspension for each 100 gallons of water.

These liquid compositions are preferably applied to the tree as a spray, and application can be by any conventional spraying apparatus. As a practical matter, such a spray is applied to the entire upper portion of the tree, but from a technical standpoint, it is important only that the bud be coated with the composition.

The buds must be treated while they are still in the dormant stage, that is, after they have formed on the branches but before they have opened. In most areas the treatment is made in early spring.

This invention will be more easily understood and practiced by referring to the following illustrative examples:

*Example 1*

Budding apple trees are sprayed during an unseasonably warm spell with the composition disclosed in copending U.S. application Serial No. 755,428 and previously described. It is applied at three gallons per one hundred gallons of water. Enough of the aqueous composition is sprayed directly onto the upper portions of the tree to insure that the buds are coated. The breaking of the buds' dormancy is delayed about 10 days. The buds show no damage from a frost during this period and develop normally after the delay into healthy fruit.

*Example 2*

The composition used in Example 1 is applied in a similar fashion to pear and orange buds. The bud break is delayed until after a frost. There is no damage to the blossoms and fruit develops normally.

The embodiments of the invention in which an exclusive property or privilege is claimed are:

1. Method for delaying bud-break in fruit trees, said method comprising coating the dormant buds of said trees, after the buds have formed but before the buds have reached the vegetative stage, with tetramethylthiuram disulfide in an inert liquid carrier.

2. Method for delaying bud-break in fruit trees, said method comprising coating the dormant buds of said trees, after the buds have formed but before the buds have reached the vegetative stage, with a composition containing 0.1% to 0.5% by weight of tetramethylthiuram disulfide and water.

References Cited in the file of this patent

Schmidt in "Chemical Abstracts," vol. 50, 1956, col. 10861f.

Martin: "Guide to Chemicals Used in Crop Protection," 3rd Edition, 1957, pages 294–295.